May 17, 1927.

F. RUSPOLI 1,629,227

MANEUVER INDICATOR

Filed Feb. 9, 1922

Inventor
F. Ruspoli

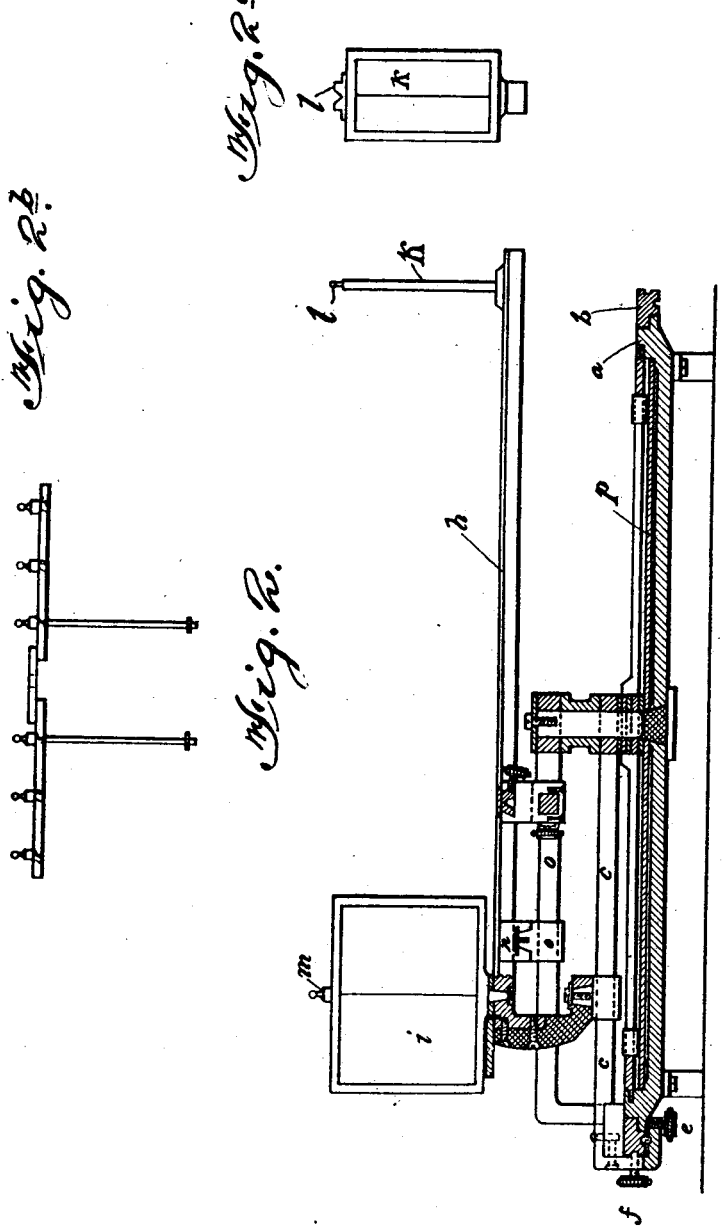

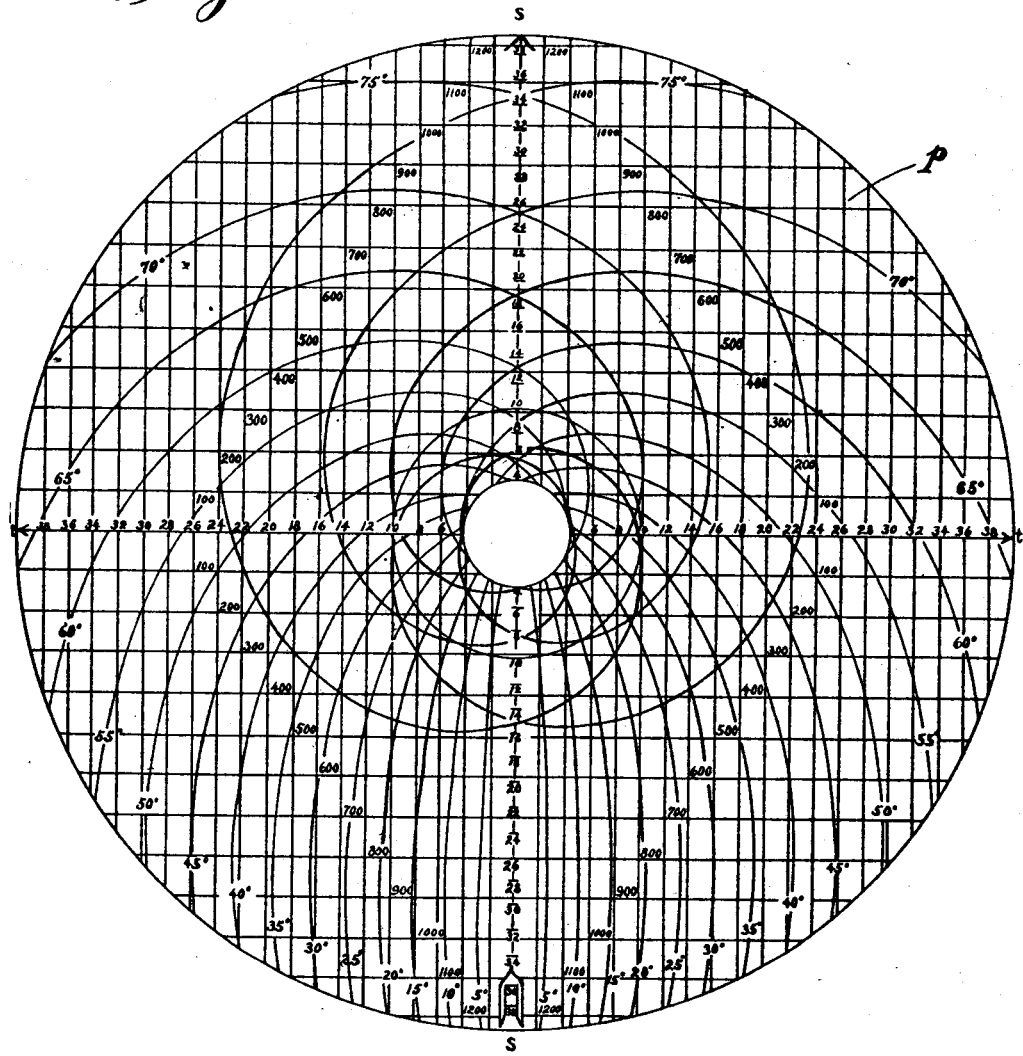

May 17, 1927.
F. RUSPOLI
1,629,227
MANEUVER INDICATOR
Filed Feb. 9, 1922
4 Sheets-Sheet 4
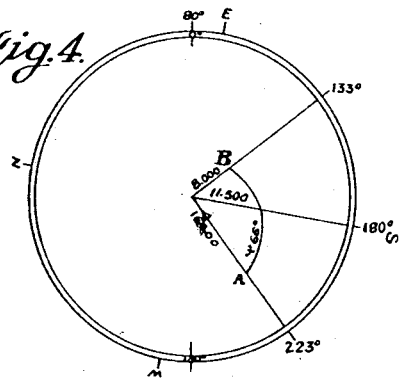
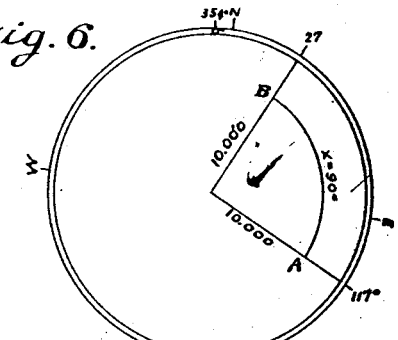
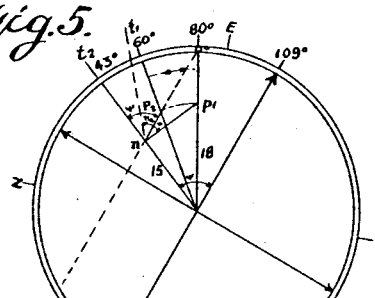
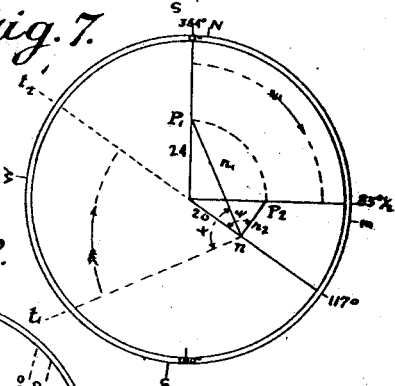
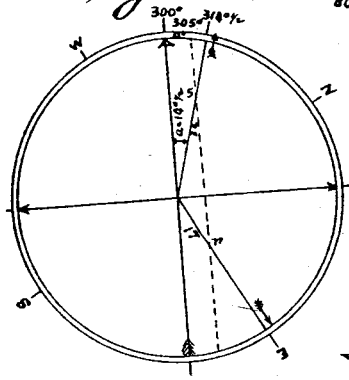
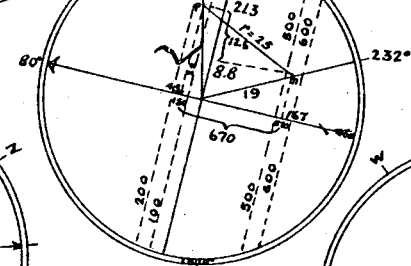
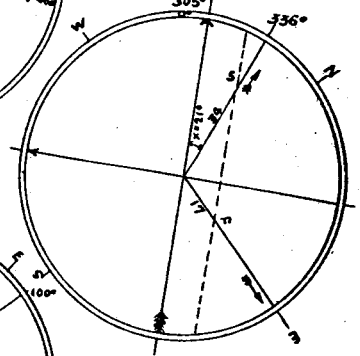
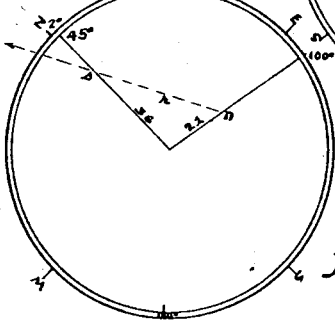
Inventor.
F. Ruspoli Patented May 17, 1927.

1,629,227

UNITED STATES PATENT OFFICE.

FABRIZIO RUSPOLI, OF TURIN, ITALY.

MANEUVER INDICATOR.

Application filed February 9, 1922. Serial No. 535,133.

This invention relates to a navigational and tactical instrument and to what might be more properly termed a maneuver indicator, or an instrument particularly adapted for easily and promptly solving tactical maneuver problems and for carrying out a new and novel method of steering, which, for want of a better expression, might be termed "relative sighting", whereby any change of position of one ship can be effected with regard to another ship of lesser speed in such a way that during the maneuver the distance between the ships changes continually in the same sense, that is, gradually increases or diminishes from the initial positions to the final ones, or remains constant in case the initial and final distances are equal.

This "relative sighting" maneuver is invaluable in facilitating fire control; in avoiding closing within a dangerous distance from another ship, and in bringing a greater number of guns to bear than would often be the case if maneuvering by direct route.

The instrument continuously indicates the relative velocity in direction and magnitude and it offers means in coastal navigation of following with the utmost facility and exactness the circles corresponding to what are known as "vertical" and "horizontal" danger angles, and also curved tracks according to any logarithmic spiral having as a focus a landmark in sight. This latter maneuver, when feasible, has the further advantage of avoiding repeated changes of course in proximity of the coast and of progressively reducing any uncertainty due to an error that might have occured in fixing the ship's position, and this for the reason that all logarithmic spiral tracks converge towards the focus, while in plotting successive compass courses any initial error is carried forward in its entirety.

Further, by means of the present instrument it is possible to solve all of the well-known tactical problems in a simpler and more intuitive way than is the case when working them out with other instruments.

It also enables reading at a glance deflection and rate of change of range for any given relative velocity and to easily obtain the data for torpedo work without necessarily having recourse to the instruments especially used for such purposes.

These advantages, of simpler and more intuitive working, increasing the rapidity of operation while diminishing the chances of error, are due to the combination of a fixed scale ring and a movable azimuth ring whereby the instrument is practically a "hand gyroscope", which enables the various bars to be kept set according to the true direction in space of the velocities or bearings which they represent. Also to the facts that each bar is used always and exclusively, for one's own velocity (ship's or torpedo's), the other ship's velocity, or the relative velocity, as the case may be, and the instrument is composed of an irreducible minimum of parts.

Besides the objects above broadly set forth other objects will be in part obvious and in part hereinafter pointed out in connection therewith by the following analysis of this invention.

The invention accordingly consists in the features of the construction and combination of parts and in the unique relation of the members and the relative proportioning and position thereof as well as the various steps of the process and method and the relation of each step to each one or several of the others, as more clearly outlined hereinafter, to enable others skilled in the art to so fully comprehend the underlying features thereof that they may embody the same by numerous modifications in the structure and the relation contemplated by this invention.

Drawings depicting one of various possible forms have been annexed as part of this disclosure and in such drawings like characters of reference denote corresponding parts throughout all the views, in which—

Figure 2 is a transverse section of the instrument as shown in Fig. 1, certain parts being broken away;

Figure 1:
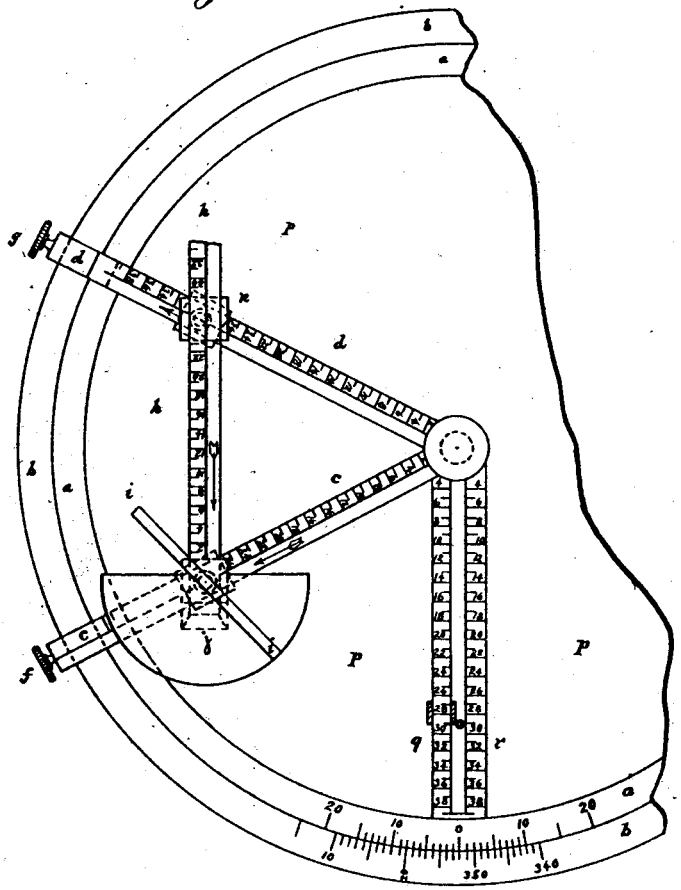
Figure 1 is a plan view of the major portion of the instrument.

Figures 2$^a$ and 2$^b$ are detail views;

Figure 3 is a plan view of the movable disc;

Figures 4 to 11 are diagrammatic views illustrating various problems by way of example, which may be solved by the mechanism hereinafter described.

Referring now to these drawings in detail and more paricularly to Figure 1, a fixed ring $a$ is graduated from 0° to 180° on each side starting from the direction of the bow of the ship. Adjacent this ring is an azimuth ring $b$ graduated from 0° to 360° movable with slight friction around the fixed ring and which by an assistant helmsman must be maintained set in accordance with the magnetic compass, by keeping the ship's course read directly thereon constantly corresponding with the lubber's point indicated by the 0° of the fixed ring a.

Two velocity bars, one of which c is for the velocity of one's own ship, can be clamped either to the fixed ring, in the direction of the bow or in the direction of the torpedo tube, by means of a set screw e, or to the azimuth ring by means of the screw f. The other bar d is for the other ship's velocity and is clamped to the azimuth ring in a position corresponding to her course by means of screw g.

A sighting bar h, or relative speed bar, together with bars c and d, constitutes the mechanical triangle or triangle of velocities. This bar at its further end, in correspondance with the axis of the cursor of the velocity bar c (for the velocity of one's own ship) carries a suitable sighting device, such as a mirror i having a vertical hair line, which device can be set for the relative sighting angle marked on a semi-circle j fixed to the bar. It may be here noted that if a mirror is used these graduations must be twice the actual angle between the mirror and the bar. For sighting angles smaller than 15°, which angles rarely occur in practice, the horizontal field of the mirror is restricted to less than 2° and, therefore, it is advisable to give up the use of the mirror, sighting directly by means of a cross sight, Figure 2$^b$, which can be fixed above the mirror when turned to a 0° angle.

At its other end the bar carries a sighting window k, the edges of which determine on each side a collimation line inclined 2½° on the central one. Above the window k there is a sighting notch l which, together with the sight m situated on the frame of the mirror, determines a sight-line along the alidade, which defines the direction of the relative motion when making use of the triangle of velocities.

The relative velocity bar should move freely in its cursor n, which is articulated to the cursor o of the other ship's velocity bar; therefore, the pressure screw e should be kept tight, and care should be taken that the screw of the cursor n is loose. This latter screw is useful when one must graduate or rectify the graduation of the other ship's velocity bar, according to the measured relative motion data.

A disk p, as shown in Figure 3, preferably of nickled brass, can rotate with slight friction within the fixed ring, and two position arms q and r, are graduated in the uniform scale adopted for the velocity bars and for the diametrical grooves s and t (Figs. 3). On this disk are engraved a series of lines parallel to the diametrical grooves and at equal distances, for instance, of two graduations from each other; a series of lines perpendicular thereto and spaced for rate of change of distance, for instance, apart 3.236 graduations (the speed of 3.236 knots corresponding to that of 100 meters per minute) and numbered 100, 200, etc., from the center of the instrument towards the periphery; the series of logarithmic spirals between 0° and 90° for instance, from 5° to 75°, each spiral having its center at the center of the instrument and a common point of origin situated at a convenient distance on the diametric groove.

It is well known that the logarithmic spiral is the plane curve that has the property that the radius vectors emanating from a fixed point—the focus of the spiral—cut the curve under a constant angle, viz, form a constant angle with the tangent to the curve at the point of interception.

The path of a ship that steers keeping a landmark, or other object at rest, at a constant angle on the bow, is a logarithmic spiral, which becomes a circle when the said angle is 90°, and a straight line when the angle is 0° or 180°.

If the ship in following a logarithmic spiral travels at a constant speed, the rate of change of distance from the focus will be constant and substantially equal to the speed multiplied by the cosine of the angle on the bow.

The above is sufficient to show the ease with which a ship can be made to follow a logarithmic spiral track having as focus a visible object at rest, and explains the advantages of maneuvering with regard to a movable object, or other ship, in such manner that the relative motion shall result in a logarithmic spiral, as is the case in relative sighting maneuvers.

These maneuvers are rendered possible by use of the present indicator, as essential feature of which is the triangle of velocities which, by means of the azimuth ring, is constantly kept set for the true directions in space, and continuously indicates on its sliding side the relative velocity in direction and magnitude.

By means of the mirror, or other sighting device, mounted on this sliding side, or relative velocity bar, and set at any required angle with the same, it is easy to steer so as to keep constant the angle between the bearing of the other ship and the relative track, which thus will result in a logarithmic spiral, viz, the distance between the two ships will constantly decrease, or remain unaltered, or constantly increase, according as to whether the said angle is less than, equal to, or greater than 90°.

The indicator must be installed on board forward of the helmsman and in such a position as to allow the latter to steer easily while sighting, and permit his assistant, without intercepting the line of sight, to read the compass course and rotate the azimuth ring of the indicator. The 0°—180° line of the fixed ring must be exactly parallel to the keel, and, if possible, be situated on the fore and aft line of the ship. In case it should be considered necessary, the sights may be rendered luminous and a gimbal system adapted to the indicator. A gyro might likewise be applied to the azimuth ring.

This instrument, it is to be noted, should not be confused with Battenberg's course indicator having a fixed azimuth ring, a rotatable disk on which are engraved parallel and perpendicular lines equally spaced and radial position arms, or with the Dumaresq fire control instrument also having a rotatable disk, but with parallel lines spaced for deflection in miles per hour and perpendicular lines spaced for rate of change of range in yards per minute.

With this description of the construction of the instrument in mind, attention is now directed to the general idea of the use of the instrument which, unlike others in use up to the present time, gives at every instant and whatever maneuver the ship may accomplish, with regard to another ship, the relative velocity represented in magnitude and direction by the transverse alidade or sighting bar of the mechanical triangle. It is, therefore, sufficient to sight along this alidade, using, if desired, the cross sight with its graduations, to realize at a glance if and how much on the present course one's own ship will pass ahead or astern of the other ship, and for the purpose of the solution of the kinetic problems consider the latter as immovable in space and one's own ship animated by the relative velocity in magnitude and direction instead of by its own velocity. Particularly, the problems concerning change of position relative to another moving ship are solved as follows:

Take the center of the indicator as representing the other ship immovable in space. Define on the disk, with reference to the center, the initial position of one's own ship and the position desired to be taken up by the setting of the position arms for the corresponding bearings from the other ship, read on the azimuth ring set in accordance with the magnetic compass, and the indices of their cursors for the corresponding distances. Then determine the elements of the relative motion for passing from one position to the other by turning the disk and making use of the parallel lines thereon or of the series of spirals. Next, by means of the velocity bars set for one's own ship's velocity and the velocity of the other ship, form the triangle of velocities corresponding to the present courses of the two ships, and then, keeping the ship's velocity bar fixed, and rotating the velocity bar for one's own ship, deform the triangle until its third side, that is, the sighting bar or relative velocity alidade, comes parallel to the line uniting the position indices, when maneuvering by direct course, or inclined of the relative sighting angle on the other ship's bearing, when maneuvering on a curve. This latter condition is fulfilled when, having set the mirror for the inclination corresponding to the curve to be followed, the other ship is seen on the sighting line.

The graduation of the azimuth ring, corresponding to the position reached by the velocity bar for one's own ship, indicates then the direct course to be followed or the course on which to begin maneuvering by means of the relative sighting, according to whether the ship's track is to be a straight line or a curved one.

Once on this initial course, it is easy to follow the curved track by merely steering so as to keep the sighting line constantly directed on the other ship, while the azimuth ring is kept set in accordance with the magnetic compass.

To obtain the distance between the two ships at any given moment, set one of the speed bars for the bearing at that moment and read its graduations after having brought the index of its cursor on the parallel line, or on the spiral of the relative motion, which passes through the index of the other position bar set for the initial bearing and distance.

The minimum distance between two ships following direct course—naturally when the distances do not always vary in the same sense—may be read off the perpendicular groove at the point where it is intercepted by the chord, parallel to the direction of the relative motion, passing through the index of the position bar set for the initial bearing and distance.

To better illustrate the use of the indicator as presented the following examples are hereinafter explained:

To obtain change of position by relative sighting maneuver, that is, to follow constant distant tracks or tracks corresponding to the distance constantly changing in a given sense, set the azimuth ring corresponding to the magnetic compass, and the position arms for the bearing and distance of one's own ship from the other ship, designated by the center pivot, and for the bearing and distance it is desired for one's own ship to take up. Then turn the disk until one of the engraved spirals, or any imaginary spiral interpolated at sight between two contiguous spirals, passes through the position indices. From the number of this spiral, deduce the relative sighting angle (equal to the said number of its supplement to 180° according to whether one is approaching or retreating from the fixed center denoting the other ship), and incline the mirror, setting it at the proper graduation of the semi-circle situated on the relative velocity bar. Graduate the two velocity bars for speed and set the one for the other ship's velocity for the direction of its course, clamping it to the azimuth ring. After doing this, rotate the velocity bar of one's own ship, deforming the mechanical triangle until the sighting line is directed on the other ship. Then, clamp the velocity bar of one's own ship to the azimuth ring and alter the course for the direction corresponding to it, so as to begin following the curved track. One will have arrived on this track when the velocity bar of one's own ship has returned in the direction of the bow. Then, unclamp it from the azimuth ring and fix it in accordance with the zero of the fixed ring and follow the curved track by steering so as to keep the sighting line constantly directed on the other ship and the azimuth ring set in accordance with the magnetic compass.

On the movable disk it has been deemed advisable to engrave only the spirals from 5° to 75°, which are those used also for the curves of retreat from 105° to 175°. If, therefore, it is desired to follow a track corresponding to the spirals included between 75° and 105°, tracks, implying minimum changes of distance, determine the curve to be followed by means of the series of spirals on tracing paper, or by means of graph or abacus of spirals.

In the special case of the constant distant maneuver, the relative motion taking place according to a circle, that is, a spiral of 90°, the position arms are not required, it being sufficient to set the mirror for 90° on the proper side and deform the mechanical triangle by rotating the velocity bar of one's own ship until the sighting line is directed on the other ship. The graduation corresponding to said velocity bar is the direction for which to alter course to begin following the curved track.

As a specific example, attention is directed to Figures 4 and 5. In this case, the other ship is steering 43° at a speed of 15 knots. One's own ship is steering at 80° at 18 knots, directly astern of the other ship, and at 16,000 meters, and wishes to take up a position abreast of her at a distance of 8,000 meters. With this statement of conditions, it is necessary to find the relative sighting angle and the ship's head necessary to begin to follow the curved track and also the distance between the two ships when their bearing is north south.

First, to pass from the position "A" to the position "B", Figure 4, the relative sighting angle, that is, the angle corresponding to the logarithmic spiral which one would actually follow if the other ship were at rest is about 66°, that is to say, that at the beginning of the curved track the direction of relative speed should be inclined to said angle on the bearing of the other ship at that moment, namely, $43°+66°=109°$. Referring to Figure 5, following the present course $p'$ (80°) the relative motion has direction of $r'$ (third side of the triangle of velocities). Deform the triangle by rotating the velocity bar $c$ of one's own ship until the sighting line ($t'$ inclined 66° on the relative velocity bar) is directed to ($t^2$) on the other ship, when it is found that the desired initial course $p^2$ is 60°.

Setting one of the position arms for 180° (Figure 4) and moving its cursor so as to bring its index on the spiral A B, one obtains 11,500, which is the desired distance between the two ships when they will bear north-south one from the other.

Another example, as illustrated in Figures 6 and 7, represents the other ship steering for 117° at a 20 knot speed, while one's own ship is steering 354° at 24 knots and is directly ahead of the other ship at a distance of 10,000 meters. It is desired to take up a position on the port beam of the other ship at the same distance.

To find the direction of the ship's head to begin following the constant distant track, the mirror is set for the relative sighting angle of 90°, and the instrument is operated the same as previously explained, and so will be found the direction of the relative motion corresponding to the present course of one's own ship at $328\frac{1}{2}°$, and by deforming the mechanical triangle until the sighting line $t'$ (at right angles to the relative velocity bar) is directed ($t^2$) on the other ship, when it is seen that the initial desired course is $83\frac{1}{2}°$, as represented by $p^2$.

The present instrument is invaluable in determining fire control data, for it gives at any moment the value of the relative velocity in magnitude and direction and enables one to obtain continually and with the utmost ease the data necessary for fire control, that is to say, the deflection in knots and the rate of change of range in meters per minute.

To obtain this data from the triangle of velocities, or in the case of parallel or nearly parallel courses, or of a target at rest, set one position arm, used as the relative velocity bar, in the fore and aft direction with its cursor at the mark corresponding to the difference of speeds or to the speed of one's own ship. Then turn the disk so that the diametrical groove is in the direction of the other ship with the arrow head pointed towards her, the parallel chords thus resulting set in the plane of the trajectory and the perpendicular chords at right angles to the same. This done, by using the series of chords, read the values of the projections of the relative velocity on the two grooves of the disk, the deflection in knots toward the right or left, and the increase or decrease of distance in meters per minute.

If desired, one can also use as velocity bars the position arms, which permit greater precision of the readings of the projections on the grooves, from the algebraic sum of which readings the required data are obtained.

In case it is desired to steer, so as to have a given rate of change of distance per minute, form the triangle of velocities, set the diametrical grooves in the direction of the target and deform the mechanical triangle, by rotating the velocity bar of one's own ship until the projection of the third side (relative velocity) on the perpendicular groove results, equal to the desired rate of change of distance; then the marking of the azimuth ring corresponding to the velocity bar of one's own ship will give the required course to steer.

As an example, attention is directed to Figure 8, wherein the other ship, bearing 80°, steers for 232° at a speed of 19 knots. One's own ship is steering at 157° at a speed of 22 knots.

To find the fire control data, form the triangle of velocities as above explained, and it is found that the direction of the relative motion is 110°, and the corresponding speed 25 knots. Then, turn the disk with the arrow pointing towards the other ship and read the projections of the third side (relative velocity) on the two grooves. One will obtain the deflection to the left 12½ knots and decrease of distance 670 meters per minute.

For solution of torpedo control problems, clamp the other ship's speed bar to the azimuth ring as usual, fix the cursor of the velocity bar of one's own ship at the marking corresponding to the speed of the torpedo and set the bar in the direction of the torpedo tube, taking care that the mirror is at the zero marking.

Then, regardless of the maneuvers of one's own ship, if the target ship continues her course, there will always be formed and in view the firing triangle directly corresponding to the position of the torpedo tube and one may, therefore, clearly see the maneuver required to reach a position of attack.

If, instead, it is desired to obtain the torpedo firing angle, for transmission to the torpedo station, set one position arm to the speed of the target ship and the other for that of the torpedo, with the diametrical groove for the sighting line of firing (present bearing of the target ship or bearing which one wishes to reach for the attack).

Then turn the arm set for the target ship's speed to a direction parallel to her course and the other arm with the index of its cursor on the parallel chord passing through the index of the cursor of the first arm. The inclination of the second arm on the diametrical groove given by the difference of the markings read on the ring is the required firing angle.

If the course and speed of the target ship are exactly known, or if one's own ship be on the intercepting course, that is to say, if the bearing of the target and the direction of the relative motion coincide, the firing angle obtained, operating in this manner, is correct. Otherwise, it will be more or less approximate according to the degree of accuracy with which the course and speed of the target ship has been estimated.

As an example, attention is directed to Figure 9, wherein the target ship is shown steering at 100° at a speed of 21 knots, and one's own ship steering at 47°. Form the firing triangle for the position of the torpedo tube at 45° on the port bow, and a torpedo speed of 36 knots.

Clamp the target ship's velocity bar to the azimuth ring corresponding to the marking 100 and set the velocity bar of one's own ship in the direction of the torpedo tube, that is, 45° on the port bow on the fixed ring. Bring the cursors of the bars to the markings 21 and 36 and see that the mirror is at zero degrees. Then, if one's own ship should alter course it will carry with it the velocity bar of one's own ship set for the speed of the torpedo, while the target ship's velocity bar, clamped to the azimuth ring, will remain in a direction parallel to the enemy's course, and, therefore, the firing triangle will transform itself in consequence, remaining always correctly formed. If, instead of keeping her course, the target ship should alter it, it will suffice to move the corresponding speed bar to a direction parallel to her new course, to form the new firing triangle.

As a further example, assume the target ship steers for 90° at a speed of 17 knots, see Figure 10. One's own ship is heading at 305° and is able at the right moment to turn and attack on the opposite course. The speed of the torpedo is assumed to be 34 knots.

To determine the firing angles for transmission to the torpedo tube station, corresponding to when the target ship will bear respectively 30° and 45° on starboard bow, it is necessary to set the position arms for the speeds of the target ship and the torpedo, that is, 17 and 34, respectively, and set the diametrical groove to the first sighting line of attack 30° to the right of the opposite course, that is, for a direction of 300°. Then turn the arm set for the target ship's speed in a direction parallel to her course, that is, for 90° and turn the other arm until the index of its cursor results on the parallel chord passing through the index of the cursor of the first arm. Then the inclination 14½° of this second arm on the diametrical groove, inclination given by the difference of the markings 314½° and 300°, read on the rings, is the required firing angle for attack on the new course when the target ship bears 30° on the starboard bow.

Proceeding in a similar manner, see Figure 11, one will find that to attack on the opposite course, when the target ship bears 45° on the bow, the firing angle is 21°.

It will thus be seen that the present invention comprises a simple, practical instrument reduced to a minimum number of parts adapted to solve in an arcuate, reliable and efficient manner all of the tactical and maneuver problems heretofore worked out with complicated instruments, calculations, or plottings, as well as a simple method whereby the corresponding maneuvers may be easily and quickly performed.

Without further analysis, the foregoing will so fully reveal the gist of this invention that others can, by applying current knowledge, readily adapt it for various applications without omitting certain features that from the standpoint of the prior art fairly constitute essential characteristics of the generic or specific aspects of this invention, and, therefore, such adaptations should, and are, intended to be comprehended within the meaning and range of the equivalency of the following claims:

I claim:

1. In an instrument of the class described, in combination, a supporting member, a disk rotatably mounted in said member and having marked on its surface a series of logarithmic spirals, having the center of the disk as a focus, and having a series of parallel lines spaced at a definite distance apart and numbered from the center, a series of parallel lines perpendicular to said first series and definitely spaced, and position indicators mounted on said supporting member in coacting relation with respect to said markings.

2. In an instrument of the class described, in combination, a support, a disk rotatably mounted in said support and having marked on its surface a series of logarithmic spirals, said spirals having the center of the disk as a focus, and having a series of parallel lines spaced at a definite distance apart and numbered from the center, and a series of parallel lines perpendicular to others of said series and definitely spaced, two position arms adapted to be rotated about a center common to the disk, and movable cursors slidably mounted thereon.

3. In an instrument of the class described, in combination, an azimuth ring, a disk associated with and rotatable with respect to said ring, having on its surface a series of logarithmic spirals, said spirals having the center of the disk and ring as a focus, and position indicators rotatable about said center and co-acting with said spirals, whereby the elements of relative motion of an object in passing from one position to another desired position, as represented by said position indicators, about another object immovable in space as represented by said center, may be determined by said spirals.

4. In an instrument of the class described, in combination, a fixed ring, a rotatable azimuth ring, concentric therewith, two velocity bars rotatable about a center common to said ring, cursors slidably mounted thereon, and a relative velocity bar mounted in said velocity bar cursors and adapted to be pivotally and slidably mounted thereon, and a sighting device which may be set at any desired angle with respect to said relative velocity bar and mounted on the same.

5. In an instrument of the class described, in combination, a fixed ring, a rotatable azimuth ring concentric therewith, a disk rotatable in said fixed ring, two bars rotatable about a center common to said ring and disk, cursors slidably mounted thereon, said cursors adapted to be used either as position indices or velocity indicators, and a sighting device having an operative connection with one of said bars through the cursor mounted thereon.

6. In an instrument of the class described, in combination, a fixed ring, a rotatable azimuth ring concentric therewith, a disk rotatable in said fixed ring, two velocity bars rotatable about a center common to said ring and disk, cursors slidably mounted thereon, a relative velocity bar mounted in said velocity bar cursors, and adapted to be pivotally and slidably moved therein, a sighting device which may be set at any desired angle with respect to relative velocity bar, and mounted on the same.

7. In an instrument of the class described, in combination, a fixed ring, a rotatable azimuth ring concentric therewith, a disk rotatable in said fixed ring, two velocity bars rotatable about a center common to said ring and disk, cursors slidably mounted thereon, a relative velocity bar mounted therein, a mirror having a collimation line, mounted on one end of said relative velocity bar, and a co-acting sighting means at the other end.

8. In an instrument of the class described, in combination, a fixed ring, a rotatable azimuth ring concentric therewith, a disk rotatable in said fixed ring, two position arms adapted to be rotated about a common center, movable cursors slidably mounted thereon, two velocity bars rotatable about a center common to said ring, cursors slidably mounted thereon, a relative velocity bar mounted in said velocity bar cursors and adapted to be pivotally and slidably mounted therein and means to sight an object along said relative velocity bar.

9. In an instrument of the class described, in combination, a fixed ring, a rotatable azimuth ring concentric therewith, a disk rotatable in said fixed ring having marked on its surface a series of logarithmic spirals, said spirals having the center of the instrument as a focus, two velocity bars rotatable about a center common to said ring and disk, cursors slidably mounted thereon, and a relative velocity bar mounted in said velocity bar cursors, and adapted to be pivotally and slidably moved therein.

10. In an instrument of the class described, in combination, a fixed ring, a rotatable azimuth ring concentric therewith, a disk rotatable in said fixed ring, and two position arms rotatable about a center common to said ring and disk, said positions arms having movable cursors slidably mounted thereon, two velocity bars rotating about said common center, having cursors slidably mounted thereon, a relative velocity bar mounted on said velocity bar cursors and adapted to be pivotally and slidably moved therein, a mirror having a vertical collimation line mounted on one end of said relative velocity bar, and a co-acting sighting device at the other end of said relative velocity bar.

11. In an instrument of the class described, in combination, a rotatable disk having marked on its surface a series of logarithmic spirals, said spirals having the center of the disk as focus and a series of parallel lines spaced at a definite distance apart and numbered from the center, and a series of parallel lines perpendicular to the other of said series and definitely spaced, two position arms adapted to be rotated about a common center, movable cursors slidably mounted thereon, two velocity bars rotatable about a center common to said disk, having cursors slidably mounted thereon, and a relative velocity bar mounted in said velocity bar cursors, and adapted to be pivotally and slidably moved thereon.

12. In an instrument of the class described, in combination, a graduated fixed ring, a graduated rotatable azimuth ring concentric therewith, two graduated velocity bars rotatable about a center common to said ring, cursors slidably mounted thereon, a graduated relative velocity bar mounted in said velocity bar cursors, and adapted to be pivotally and slidably mounted therein, a mirror having a vertical hair line mounted on one end of said relative velocity bar, said mirror being mounted on a vertical pivot, a sighting window at the other end of said relative velocity bar, and a graduated device for said mirror whereby the line of sight determined by the same may be set at any required angle with the relative velocity bar.

13. In an instrument of the class described, in combination, a graduated fixed ring, a graduated rotatable azimuth ring concentric therewith, two graduated position arms adapted to be rotated about a common center, movable cursors slidably mounted thereon, a rotatable disk, two graduated velocity bars rotatable about a center common to said ring, cursors slidably mounted thereon, a graduated relative velocity bar mounted in said velocity bar cursors, and adapted to be pivotally and slidably mounted therein, and a sighting device which may be set at any desired angle with respect to said relative velocity bar and mounted on the same.

14. In an instrument of the class described, in combination, a graduated fixed ring, a graduated rotatable azimuth ring concentric therewith, a disk rotatable in said fixed ring, having marked on its surface a series of logarithmic spirals, said spirals having the center of the instrument as a focus, and having a series of parallel lines equally spaced and numbered from the center according to the common scale adapted for position arms and velocity bars, and a series of parallel lines perpendicular to the other of said series spaced and graduated for rate of change of distance, two graduated position arms adapted to be rotated about a common center, movable cursors slidably mounted thereon, two graduated velocity bars rotatable about a center common to said ring, cursors slidably mounted thereon, a graduated relative velocity bar mounted in said velocity bar cursors, and adapted to be pivotally and slidably mounted therein, a mirror having a vertical hair line mounted on one end of said relative velocity bar, said mirror being mounted on a vertical pivot, and a sighting window at the other end of said relative velocity bar, a graduated device for said mirror, whereby the line of sight determined by the same may be set at any required angle with the relative velocity bar, and means for clamping one of said velocity bars to both the azimuth and fixed rings and the other of said velocity bars to the azimuth ring only.

In testimony whereof I affix my signature.

FABRIZIO RUSPOLI.